United States Patent
Hou et al.

(10) Patent No.: US 8,373,656 B2
(45) Date of Patent: Feb. 12, 2013

(54) FINGER POINTING APPARATUS

(75) Inventors: Zifeng Hou, Beijing (CN); Jinping Yang, Beijing (CN); Cheng Lv, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 982 days.

(21) Appl. No.: 12/192,027

(22) Filed: Aug. 14, 2008

(65) Prior Publication Data

US 2009/0046059 A1  Feb. 19, 2009

(30) Foreign Application Priority Data

Aug. 15, 2007 (CN) .......................... 2007 1 0120316

(51) Int. Cl.
 *G06F 3/014* (2006.01)
(52) U.S. Cl. ....................................................... 345/157
(58) Field of Classification Search .......... 345/156–184; 341/22–34; 340/7.1, 407.1–407.2; 178/18.01–19.07
 See application file for complete search history.

(56) References Cited

U.S. PATENT DOCUMENTS

| | | | | |
|---|---|---|---|---|
| 5,126,513 A | * | 6/1992 | Wang et al. | 345/173 |
| 5,581,484 A | * | 12/1996 | Prince | 702/150 |
| 5,880,712 A | * | 3/1999 | Goldman | 345/168 |
| 2003/0214481 A1 | * | 11/2003 | Xiong | 345/157 |
| 2005/0243060 A1 | * | 11/2005 | Shono et al. | 345/158 |
| 2008/0136679 A1 | * | 6/2008 | Newman et al. | 341/20 |
| 2008/0136775 A1 | * | 6/2008 | Conant | 345/156 |

FOREIGN PATENT DOCUMENTS

CN    1991716 A    7/2007

* cited by examiner

*Primary Examiner* — Liliana Cerullo
(74) *Attorney, Agent, or Firm* — Kinney & Lange, P.A.

(57) ABSTRACT

A finger pointing apparatus is disclosed. In one aspect the finger pointing apparatus includes at least one pressure sensor fixed on a hand for triggering a corresponding electromagnetic wave transmitter to transmit electromagnetic wave when pressure is produced by a finger contacting an external object. In another aspect, the finger pointing apparatus includes at least one electromagnetic wave transmitter connected with a corresponding pressure sensor and fixed on the hand for transmitting electromagnetic wave to all electromagnetic wave receivers when pressure is detected by the pressure sensor. In one aspect, the finger pointing apparatus includes at least two electromagnetic wave receivers arranged at fixed positions with respect to each other for receiving electromagnetic wave from the at least one electromagnetic wave transmitter and transmitting received electromagnetic wave to a microprocessor. In another aspect, the finger pointing apparatus includes a microprocessor for receiving electromagnetic wave from the electromagnetic wave receivers, calculating coordinate values of a position pressed by the finger from electromagnetic wave from different electromagnetic wave receivers and outputting the coordinate values.

8 Claims, 6 Drawing Sheets

FINGER POINTING APPARATUS

BACKGROUND OF THE INVENTION

1. Field of the Invention

The present invention relates to computing devices, and in particular relates to a finger pointing apparatus.

2. Description of the Related Technology

People have been seeking a convenient input device, which is especially important for portable devices.

Much research has been conducted in this aspect. However, most devices are complex or inconvenient, or expensive. Hence a portable and convenient input device is desired.

A existing solution is Determination of finger position, which detects the position of the finger by measuring bend of the finger.

This solution has a number of disadvantages in that the measurement of bend of the finger is relatively complex, and the device used is also relatively complex. As a consequence, this solution is often used in cases where expensive devices may be used, such as virtual reality.

Another existing solution is Hand-movement-sensing input device, which detects the position and movement of the hand based on images.

This solution is disadvantageous in that the device is complex. The most prominent disadvantage is that the positions of the hand are limited.

SUMMARY OF CERTAIN INVENTIVE ASPECTS

In view of the above one or more problems, a finger pointing apparatus that can be placed directly on a hand is disclosed. The finger pointing apparatus is easy to manufacture and convenient to carry and use. The finger point apparatus can be used in controlling a cursor, performing controls in a similar manner as a mouse, and controlling scrolling bars and windows.

In one aspect there is a finger pointing apparatus, characterized in that the apparatus includes at least one pressure sensor fixed on a hand, for generating a trigger signal when pressure is produced by a finger contacting an external object; at least one electromagnetic wave transmitter corresponding to the pressure sensor, connecting with the pressure sensor and fixed on the hand together with the same, for transmitting a first electromagnetic wave after receiving the trigger signal; at least two electromagnetic wave receivers arranged at fixed positions with respect to each other, for receiving the first electromagnetic wave and generating a second electromagnetic wave and a third electromagnetic wave; and a microprocessor connected with the at least two electromagnetic wave receivers, for calculating coordinate values of a position pressed by the finger based on the second electromagnetic wave and the third electromagnetic wave and outputting the coordinate values.

The at least one pressure sensor and the at least one electromagnetic wave transmitter can be fixed on the finger, and the at least two electromagnetic wave receivers can be arranged on different positions on a palm.

One of the at least one electromagnetic wave transmitter can be used as a mouse. Movement of the mouse is represented by movement of the finger in respective directions. The other electromagnetic wave transmitters of the at least one electromagnetic wave transmitter may be used as function keys. The other function keys may be represented by pressing, rotating or specific movement.

The finger pointing apparatus according to certain embodiments further comprises a switch for switching between mouse function and keyboard function. The switch is arranged at a position easy for operation, and can be arranged together with the microprocessor.

In one embodiment, the finger pointing apparatus of the present invention comprises two electromagnetic wave receivers, one of which is arranged on a left side of the palm, and the other is arranged symmetrically on a right side of the palm. The at least one pressure sensor and corresponding electromagnetic wave transmitter may be arranged on a middle finger.

The finger pointing apparatus of the present invention can be used for inputting various objects, including letters, numbers, symbols, characters, lines, and/or curves.

BRIEF DESCRIPTION OF THE DRAWINGS

The drawings are illustrated to provide further understanding of the present invention and constitute a part of the present application. Exemplary embodiments of the present inventions and descriptions thereof are provided for explaining the present invention rather than unduly limiting the present invention. In the drawings.

DETAILED DESCRIPTION OF CERTAIN INVENTIVE EMBODIMENTS

Next, detailed embodiments of the present invention are illustrated with reference to the drawings.

Figure 1:
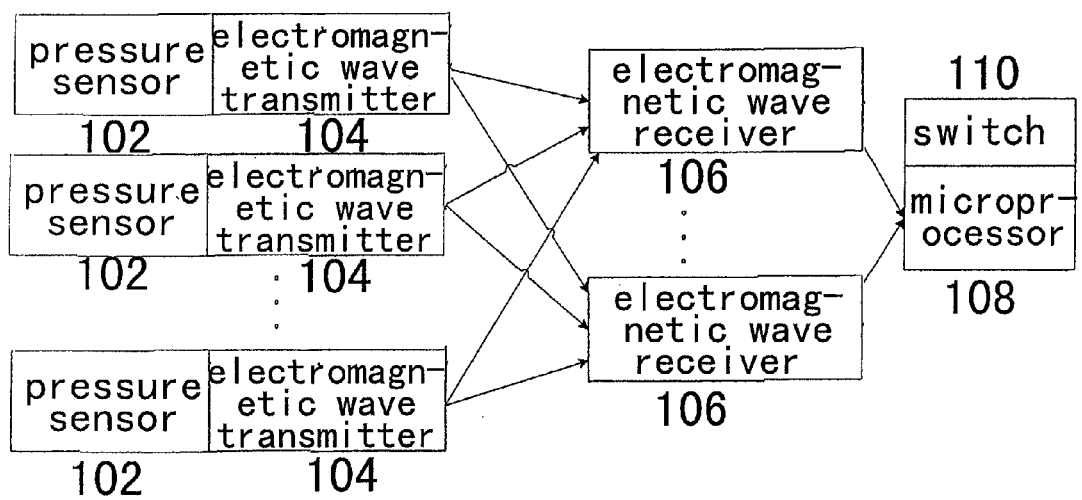
FIG. 1 is a schematic diagram of the finger pointing apparatus according to an inventive embodiment.

FIG. 1 is a schematic diagram of the finger pointing apparatus according one embodiment. As shown in FIG. 1, an embodiment of the finger pointing apparatus of the includes at least one pressure sensor 102, at least one electromagnetic transmitter 104 corresponding to respective pressure sensor, at least two electromagnetic receivers 106 and a microprocessor 108, wherein the at least one pressure sensor is fixed on the hand, for triggering a corresponding electromagnetic wave transmitter to transmit electromagnetic wave when pressure is produced by the finger contacting an external object; the at least one electromagnetic wave transmitter is connected with a corresponding pressure sensor and fixed on the hand, for transmitting electromagnetic wave to all of the electromagnetic wave receivers when pressure is detected by the corresponding pressure sensor; the at least two electromagnetic wave receivers may be arranged at fixed positions with respect to each other, for receiving electromagnetic wave from the at least one electromagnetic wave transmitter and transmitting received electromagnetic wave to the microprocessor; and the microprocessor receives electromagnetic wave from the electromagnetic wave receivers, calculates coordinate values of a position pressed by the finger based on electromagnetic wave from different electromagnetic wave receivers, and outputs the coordinate values.

The at least one pressure sensor and the at least one electromagnetic wave transmitter can be fixed on the finger, and the at least two electromagnetic wave receivers can be arranged on different positions on a palm.

One of the at least one electromagnetic wave transmitters can be used as a mouse. Movement of the mouse is represented by movement of the finger in respective directions. The other electromagnetic wave transmitters of the at least one electromagnetic wave transmitter may be used as function keys. The other function keys may be represented by pressing, rotating or specific movement.

The finger pointing apparatus of the present invention further comprises a switch 110 for switching between mouse function and keyboard function. The switch is arranged at a position easy for operation, and can be arranged together with the microprocessor.

The finger pointing apparatus, according to certain embodiments, may include two electromagnetic wave receivers, the positions of which is fixed with respect to each other and is known. One of the electromagnetic wave receivers is arranged on a left side of the palm, and the other is arranged symmetrically on a right side of the palm. The at least one pressure sensor and corresponding electromagnetic wave transmitter may be arranged on a middle finger. The finger pointing apparatus of the present invention can be used for inputting various objects, including letters, numbers, symbols, characters, lines, and/or curves.

Figure 2:
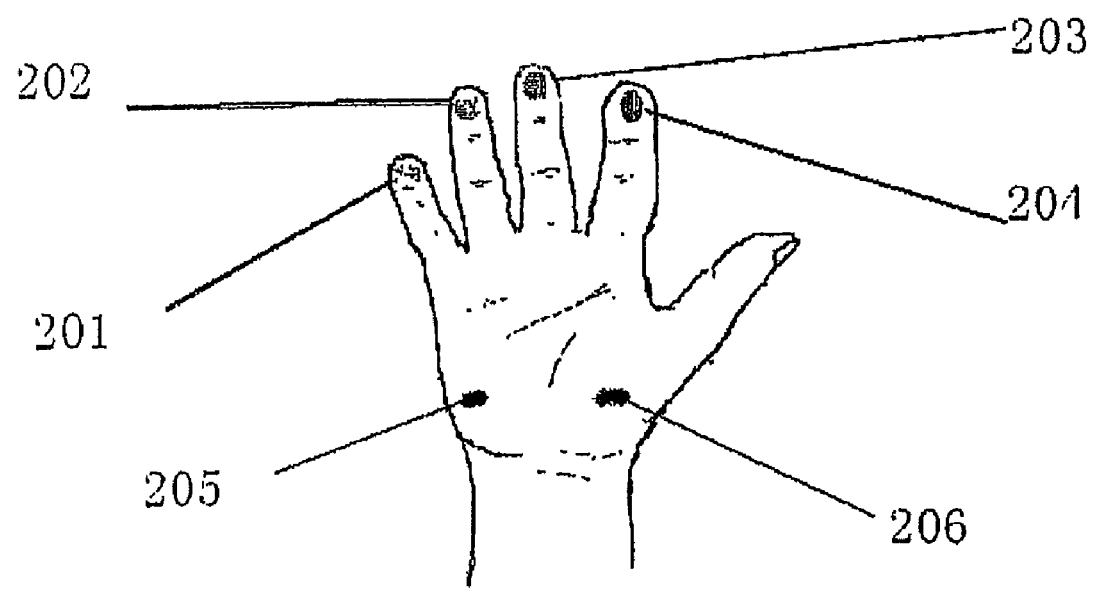
FIG. 2 is a front view of the palm according to an embodiment of the present invention.
Figure 3:
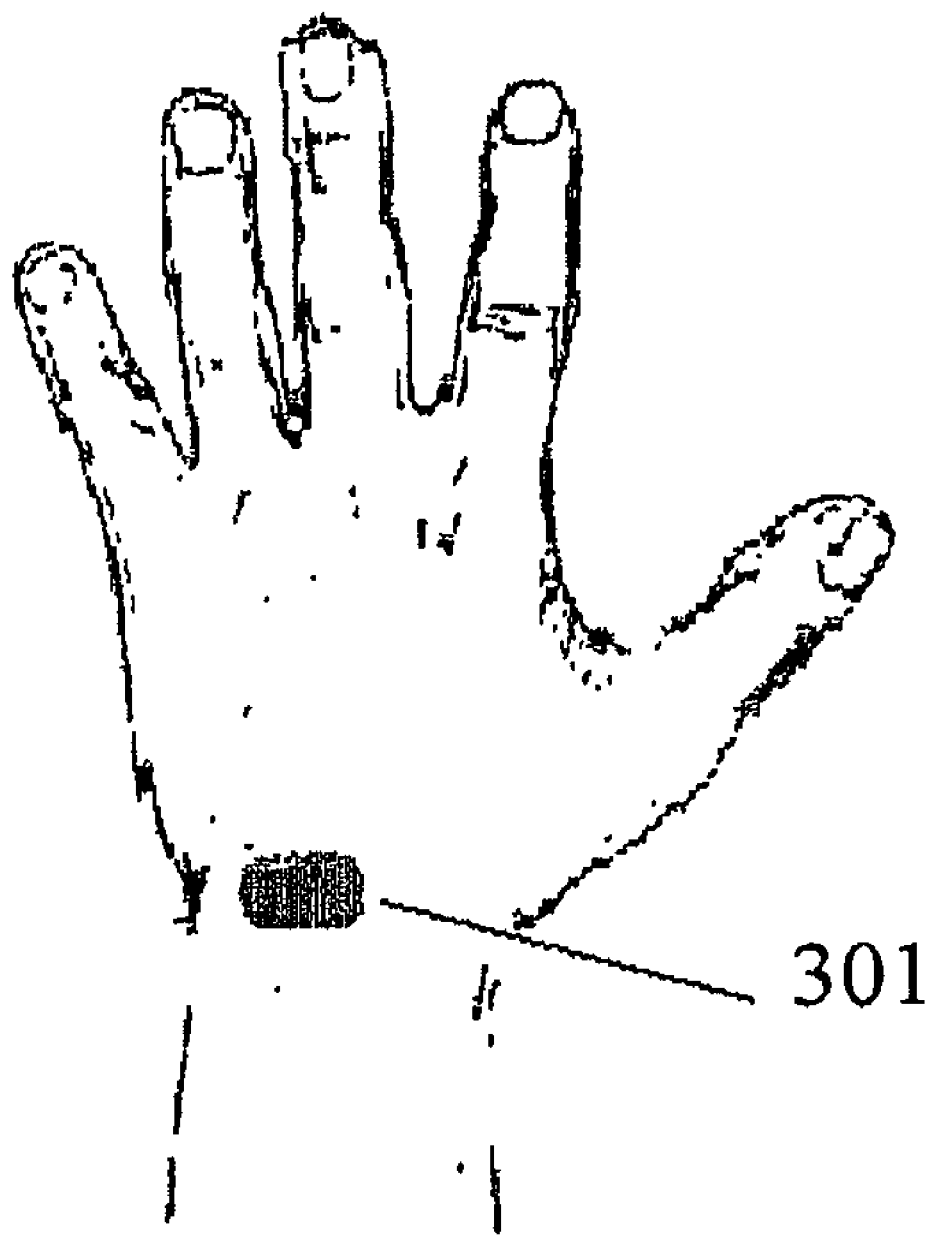
FIG. 3 is a back view of the palm according to an embodiment of the present invention.

FIG. 2 is a front view of the palm according to an embodiment. As shown in FIG. 2, components 201, 202, 203, 204, and 205 are pressure sensors that can be triggered and electromagnetic wave transmitters that transmit electromagnetic wave on ends of fingers. Components 105 and 106 are electromagnetic wave receivers. The component 301 of FIG. 3 is a microprocessor for receiving data signals from the electromagnetic wave receivers and measuring distances from the transmitter on the finger to the receivers based on phase differences.

Since there may be two electromagnetic wave receivers on the palm, electromagnetic wave transmitted by the electromagnetic wave transmitters on the fingers may be received by the two electromagnetic wave receivers and then the spatial positions of the electromagnetic wave receivers on the fingers can be calculated.

When one finger is placed on a hard object (e.g. on a desktop, a kneel, or even in a pocket of clothes, so far as the pressure sensor can sensing pressure), and if there is a pressure sensor on the finger, distance can be measured and the measurement result is transmitted to a host.

Each finger (of the two hands) can be equipped with such electromagnetic wave transmitter and pressure sensor. The key point is how to configure them.

In some embodiments, there are three basic input modes: 1) input by pressing; 2) input by movement of the finger; and 3) input by certain movement patterns, e.g. clockwise or anticlockwise movement of the finger represents different rotations; rightward followed by downward movement represents a use mode of a certain weapon or a cant; or the movement patterns may be used to represent passwords.

Since there may be multiple fingers and modes, more meanings can be represented than a mouse or keyboard. Further, direction representation by fingers brings more convenience.

When the finger pointing apparatus is used as a mouse, means on a middle finger on a right hand may be used for controlling the cursor. When the middle finger presses down, the cursor control begins. The cursor moves in accordance with the movement of the finger. When the middle finger lifts up, the cursor control ends. If, at this time, the cursor does not reach the desired position, the middle finger can move back a distance in the air and press down to control the cursor until it reaches the desired position. Meanwhile, means on a forefinger can be used as a left key of the mouse, and means on a ring finger can be used as a right key of the mouse. Further, means on thumb or little finger can be used for controlling wheels. Two fingers can control two wheels, one of which can represent up-down scroll of a document and the other can represent left-right scroll of the document.

The whole finger pointing apparatus can be used to input different meanings. For example, it can be used to input letters, numbers, or symbols. Each finger can move within a certain range in a plane, such that different symbols can be defined. For example, if five positions (front, back, left, right, middle) is defined for a finger, when the finger presses down, five symbols may be represented by different positions (defined by the nearest position). Thus ten fingers represent fifty symbols. As a matter of fact, meanings can also be defined for cases where two or more fingers press down simultaneously, which may generate more combinations. Further, more than five positions can be defined for one finger, e.g. nine positions including front-left, front-right, back-left, back-right in addition to the above-mentioned five positions.

If a switch is mounted on a convenient position of the hand, the above two applications can be implemented by the same finger pointing apparatus, wherein the switch is switched between two states, one of which is used for controlling the mouse, and the other is used for controlling the keyboard.

Further, the present apparatus can be used as a game control. For example, certain fingers press down to represent shoot of different weapons. Certain fingers move to represent movement of a whole object or a part of the object. Rotation in different directions (clockwise or anticlockwise) represents rotation of the object, etc. The meaning represented can be defined according to the requirements of the game. In addition, before the game starts or during the game, the apparatus can be switched to another mode such as the keyboard input mode to change parameters.

Figure 4:
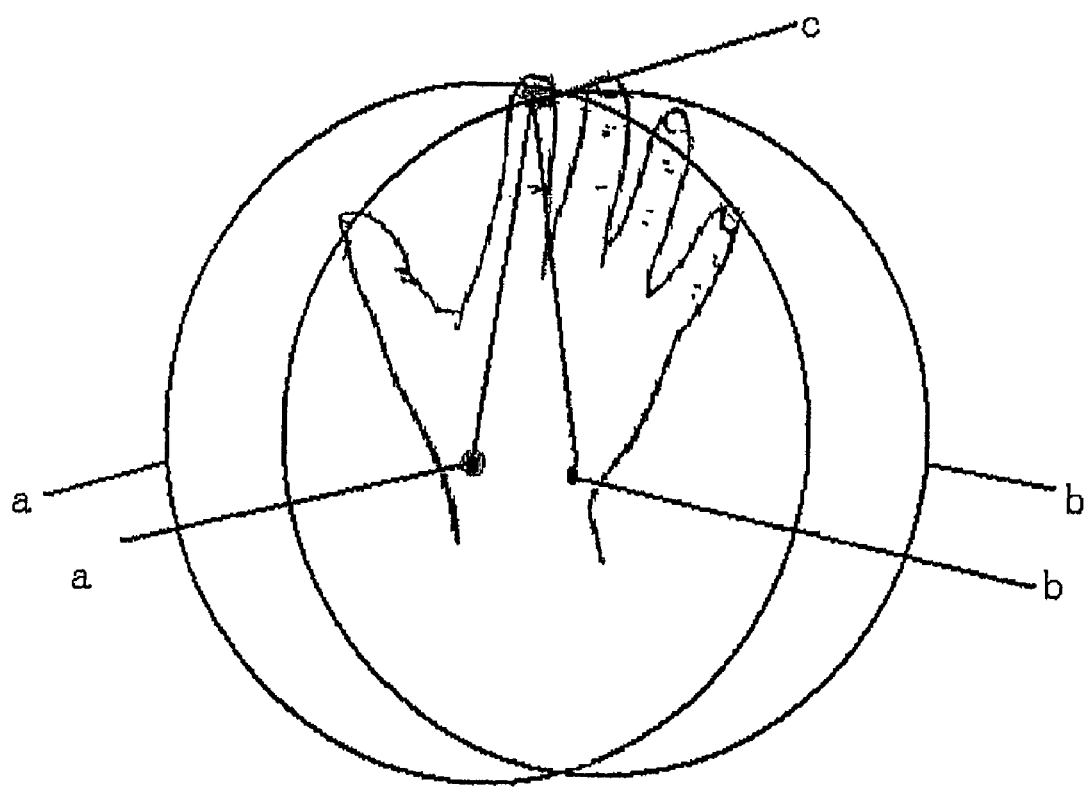
FIG. 4 and FIG. 5 are diagrams showing the position measurement according to an embodiment of the present invention.
Figure 5:
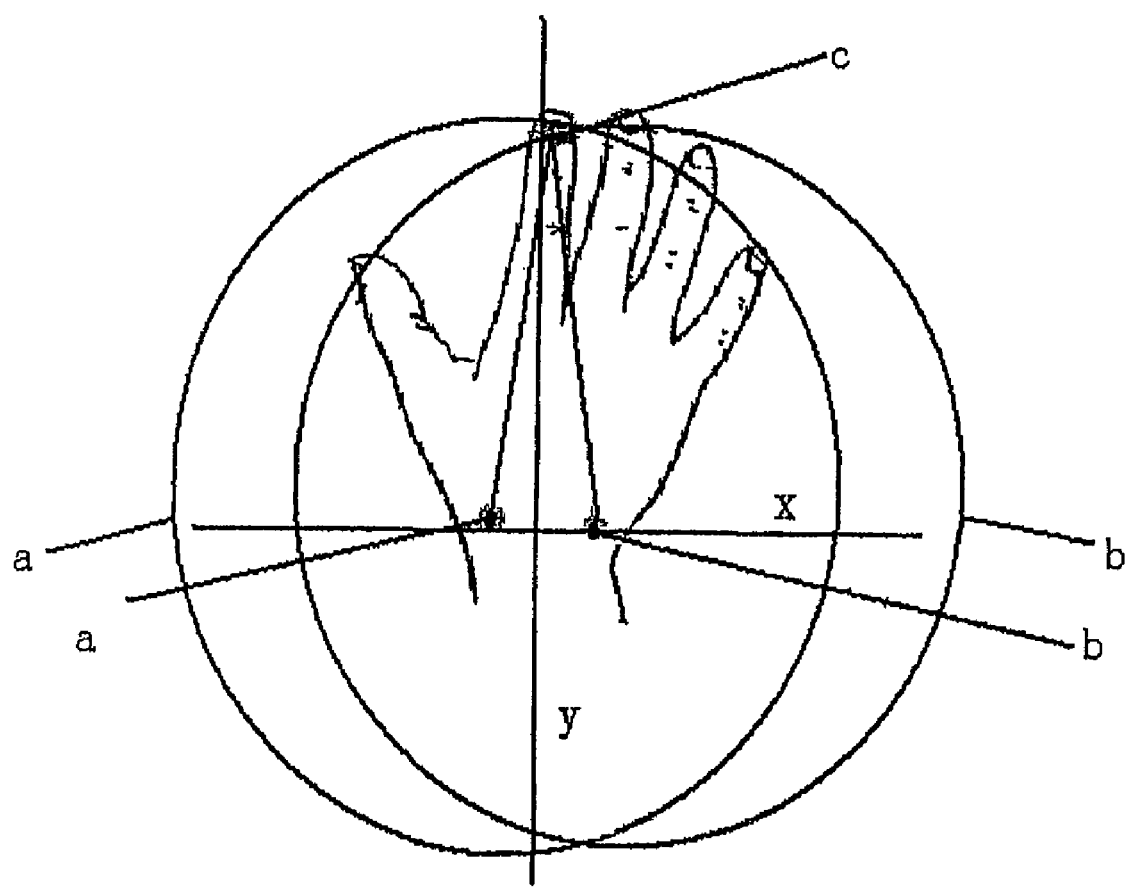

FIGS. 4 and 5 are principle diagrams showing the position measurement. In FIG. 4, a and b are electromagnetic wave receivers, and c is a pressure sensor and an electromagnetic wave transmitter on the end of a finger. When a and b measure the distance to c, it can be definitely concluded that c is on circles a' and b', which have a center of a and b and a radius of ac and bc, respectively. Thus two points of intersection can be determined on the circles and c must be at one of them instead of the other. If a coordinate as shown in FIG. 5 is established, the coordinates of c can be determined definitely. In this way the position of the finger when the electromagnetic wave transmitter is triggered can be determined precisely.

Figure 6:
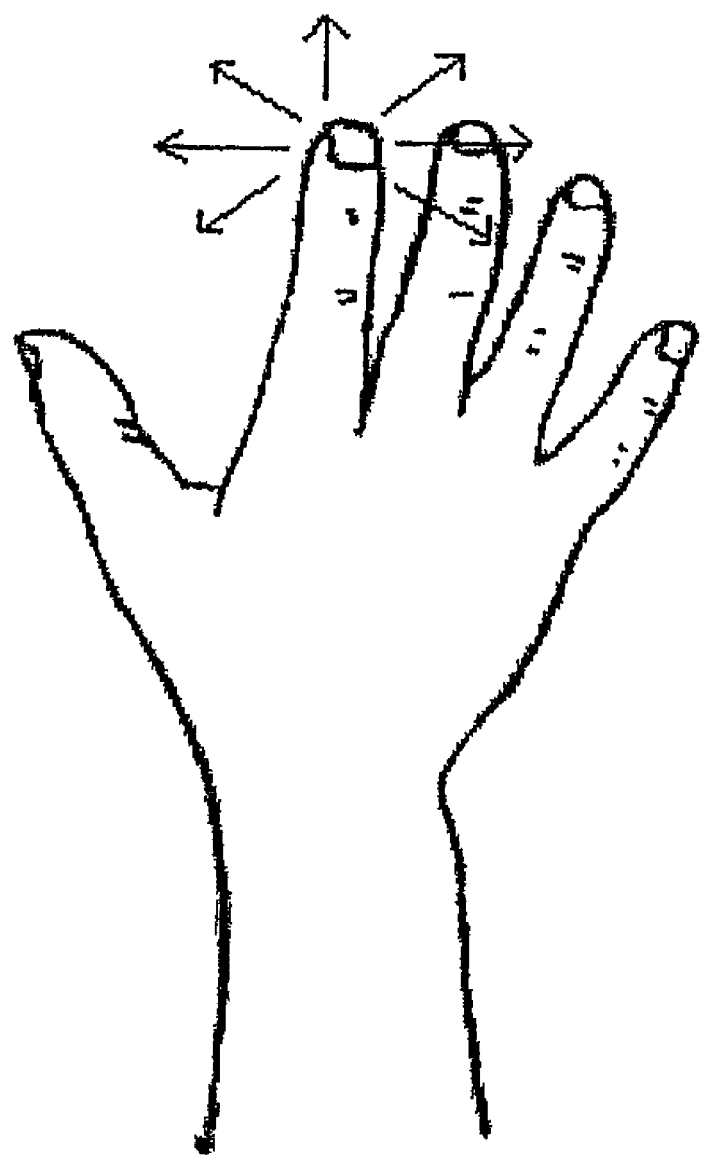
FIG. 6 is a view showing control of the movement of the mouse by movement trace of a forefinger.

FIG. 6 shows controlling the movement of the mouse by movement trace of the forefinger. The forefinger can move in various directions. During its movement, the transmitter attached to the forefinger continuous transmits signals, such that the processor traces the variations of the trace of the finger, and maps the trace to the movement of the mouse. Meanwhile, press signals of the other fingers can act as function buttons of the mouse.

As described above, the finger pointing apparatus comprises electromagnetic wave transmitters and pressure sensors attached to the end of finger, electromagnetic wave receivers attached to the palm, and a microprocessor. When the electromagnetic wave transmitter on the end of finger is triggered, the electromagnetic wave receivers and the processor cooperate to calculate the position of the finger at this time. In this way, when the finger moves in a plane, the transmitter is triggered and the processor obtains a series of positions during the movement of the finger, which represent the movement trace of the finger. The movement trace can be mapped to a movement trace of the mouse in the display.

Since such transmitters can be arranged on multiple fingers, more applications can be created. For example, movement of other fingers can be defined as function keys of the mouse. Movement of different fingers can represent different meanings. For example, some fingers represent cursor control, some represent scrolling bars, and some represent window switches, etc.

In addition, the receivers can be arranged at other positions, such as on the display, so that the movement range of the finger is expanded and the device complexity on the palm is reduced.

Some advantages of certain embodiments are:

1. The transmitters and receives can be made relatively small, such that they could be mounted on the hand and convenient to carry and use.

2. The transmitters and receives can be arranged on multiple fingers, such that they can not only control the cursor in a similar way as the mouse, but also control the scrolling bars and the windows.

The above description only illustrates certain embodiments of the present invention and does not constitute a limitation thereof. It is apparent to those skilled in the art that various modifications and variations can be made to the present invention. Any modification, equivalent alternation, or improvement within the spirit and principle of the present invention should be included in the protection scope of the present invention.

What is claimed is:

1. A finger pointing apparatus, comprising:
   at least one pressure sensor fixed on a hand, configured to generate a trigger signal when pressure is produced by a finger contacting an external object, wherein the external object is any object which enables the pressure sensor to sense pressure;
   at least one electromagnetic wave transmitter corresponding to the at least one pressure sensor, in data communication with the pressure sensor, fixed on the hand, and configured to transmit a first electromagnetic wave after receiving the trigger signal;
   at least two electromagnetic wave receivers arranged at fixed positions with respect to each other, each receiver configured to receive the first electromagnetic wave and configured to generate a second electromagnetic wave and a third electromagnetic wave;
   a microprocessor in data communication with the at least two electromagnetic wave receivers, configured to calculate coordinate values of a position pressed by the finger based on the second electromagnetic wave and the third electromagnetic wave and configured to output the coordinate values; and
   a switch mounted on the finger pointing apparatus and configured to enable the finger pointing apparatus to switch between a mouse function and a keyboard function, wherein when the finger pointing apparatus is used as the mouse function, it controls movement of a cursor, and when the finger pointing apparatus is used as the keyboard function, it is used for inputting letters, numbers or symbols directly, wherein different positions of the finger in a certain region represent different letters, numbers or symbols, and the letters, numbers or symbols input on a screen are determined according to the position on which the finger presses.

2. A finger pointing apparatus according to claim 1, wherein the at least one pressure sensor and the at least one electromagnetic wave transmitter are fixed on the finger, and the at least two electromagnetic wave receivers are arranged on different positions on a palm.

3. A finger pointing apparatus according to claim 1, wherein one of the at least one electromagnetic wave transmitters is used as the mouse function, and another of the at least one electromagnetic wave transmitters is used as the keyboard function.

4. A finger pointing apparatus according to claim 3, wherein the keyboard function is used for inputting function keys.

5. A finger pointing apparatus according to claim 4, wherein the function keys are represented by pressing, rotating or specific movement.

6. A finger pointing apparatus according to claim 1, wherein the two electromagnetic wave receivers are arranged in the hand's palm, one of which is arranged on a left side of the palm, and the other is arranged symmetrically on a right side of the palm.

7. A finger pointing apparatus according to claim 1, wherein the at least one pressure sensor and corresponding electromagnetic wave transmitter are arranged on a middle finger.

8. A finger pointing apparatus according to claim 1, wherein the finger pointing apparatus is used for inputting letters, numbers, symbols, character lines, and/or curves.

* * * * *